United States Patent
Kapoor et al.

(10) Patent No.: US 10,410,190 B1
(45) Date of Patent: Sep. 10, 2019

(54) NETWORK OF COMPUTING NODES AND A METHOD OF OPERATING THE COMPUTING NODES TO EFFECTUATE REAL-TIME BANK ACCOUNT-TO-BANK ACCOUNT MONEY TRANSFER

(71) Applicant: Morgan Stanley Services Group Inc., New York, NY (US)

(72) Inventors: Uma Kapoor, New York, NY (US); Olga Zeltser, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/050,565

(22) Filed: Jul. 31, 2018

(51) Int. Cl.
 *G06Q 20/10* (2012.01)
 *G06Q 20/38* (2012.01)
 *G06Q 20/36* (2012.01)
 *G06Q 20/32* (2012.01)

(52) U.S. Cl.
 CPC ....... *G06Q 20/108* (2013.01); *G06Q 20/3223* (2013.01); *G06Q 20/3678* (2013.01); *G06Q 20/38215* (2013.01)

(58) Field of Classification Search
 CPC .............................. G06Q 20/10; G06Q 20/02
 USPC .......................................................... 705/42
 See application file for complete search history.

(56) References Cited

U.S. PATENT DOCUMENTS

| | | | | |
|---|---|---|---|---|
| 2003/0208440 A1* | 11/2003 | Harada | ................... | G06Q 20/02 705/39 |
| 2003/0208840 A1* | 11/2003 | Loyd | ...................... | H02K 17/30 4/541.1 |
| 2004/0128240 A1* | 7/2004 | Yusin | ..................... | G06Q 20/02 705/39 |
| 2006/0167970 A1* | 7/2006 | Seeley | ................ | G06F 11/3419 709/202 |
| 2011/0030047 A1* | 2/2011 | Gao | ....................... | G06F 21/335 726/9 |
| 2012/0158583 A1* | 6/2012 | Evers | ................... | G06Q 20/102 705/40 |
| 2016/0132851 A1 | 5/2016 | Desai et al. | | |
| 2016/0300207 A1 | 10/2016 | Novac et al. | | |
| 2016/0342976 A1 | 11/2016 | Davis | | |
| 2016/0342989 A1 | 11/2016 | Davis et al. | | |
| 2017/0024744 A1 | 1/2017 | Finch et al. | | |
| 2017/0109714 A1 | 4/2017 | Alcorn et al. | | |
| 2017/0132626 A1 | 5/2017 | Kennedy et al. | | |
| 2017/0266103 A1 | 9/2017 | Herrmann et al. | | |
| 2017/0345011 A1 | 11/2017 | Salami et al. | | |
| 2018/0082294 A1 | 3/2018 | Davis et al. | | |

(Continued)

FOREIGN PATENT DOCUMENTS

| | | | | |
|---|---|---|---|---|
| WO | WO-2016065390 A1 * | 5/2016 | .......... | G06Q 20/065 |
| WO | WO 2017/098519 A1 | 6/2017 | | |

OTHER PUBLICATIONS

Ritcha Ranjan: "Tokenization of a Physical Debit or Credit Card for Payment." Technical Disclosure Commons (Jan. 31, 2016).*

(Continued)

*Primary Examiner* — Virpi H Kanervo
(74) *Attorney, Agent, or Firm* — K&L Gates LLP

(57) ABSTRACT

A network of computing nodes and a method of operating the computing nodes effectuate, in real-time, an international, money transfer from the bank account of a first person (the payer) in a first country to the bank account of a second person (the beneficiary) in a second, different, country.

18 Claims, 3 Drawing Sheets

(56) References Cited

U.S. PATENT DOCUMENTS

| | | | |
|---|---|---|---|
| 2018/0082303 A1 | 3/2018 | Chan-Bauza et al. | |
| 2018/0113752 A1 | 4/2018 | Derbakova et al. | |
| 2018/0144328 A1 | 5/2018 | Finch et al. | |
| 2018/0144329 A1 | 5/2018 | Finch et al. | |
| 2018/0144339 A1* | 5/2018 | Beidas | G06Q 20/10 |
| 2018/0197155 A1 | 7/2018 | Georgen et al. | |
| 2018/0197167 A1 | 7/2018 | Ganesan et al. | |
| 2018/0246623 A1* | 8/2018 | Peled | G06Q 30/06 |

OTHER PUBLICATIONS

"Committed on Payments and Market Infrastructures: Cross-border retail payments," Bank for International Settlements, pp. 1-45, Feb. 2018.

"Innovations for a Cashless World; Consumer Desire and the Future of Payments," pp. 1-75, 2017.

Windh, Jennifer, "Peer-to-peer payments: Surveying a rapidly changing landscape," Federal Reserve Bank of Atlanta, pp. 1-20, Aug. 15, 2011.

* cited by examiner

NETWORK OF COMPUTING NODES AND A METHOD OF OPERATING THE COMPUTING NODES TO EFFECTUATE REAL-TIME BANK ACCOUNT-TO-BANK ACCOUNT MONEY TRANSFER

BACKGROUND

Digital payment systems are systems that allow individuals, from a computer or mobile device, to pay transfer money electronically to another party, such as to pay for goods or services, or make a monetary gift or donation, via a computing network, without having to use physical cash, checks or credit cards. Some digital payment systems allow a registered user (the payer) of the mobile payment to transfer money from their bank account to the bank account of another person (the beneficiary or payee) that also has a bank account registered with the system, so long as both bank accounts are located in the same country. The process to wire-transfer money to a person in another country is more laborious. Complicated forms, which require, among other things, personal identifying information of the beneficiary and the beneficiary's bank, as well as information about intermediary banks if any, have to be completed, which increases the time that it takes to complete the cross-border payment. Also, different time zones and holiday schedules complicate completion of cross-border transfer in a single day. There are also high fees associated with international bank transfers, which makes it only practical for high transfer amounts (so that the fees are a relatively small percentage of the transaction).

SUMMARY

In one general aspect, the present invention is directed to a network of computing nodes and a method of operating the computing nodes to effectuate, in real-time, a money transfer from the bank account of a first person (the payer) to the bank account of a second person (the beneficiary). The payer and the beneficiary can be in the same or different countries. The transfers of the present invention are in real-time and do not require personal identifying information of the beneficiary other than the beneficiary's mobile phone number or email address. That is, unlike existing international payment schemes, the payer does not need to specify the beneficiary's bank, bank account and routing numbers, the beneficiary's bank address, etc. In various embodiments, the present invention utilizes distributed ledger technology and/or API-based network solutions so that the transactions are irrevocable and immutable.

These and other benefits of the present invention will be apparent from the description that follows.

FIGURES

Various embodiments of the present invention are described herein by way of example in connection with the following figures, wherein.

DESCRIPTION

Figure 1:
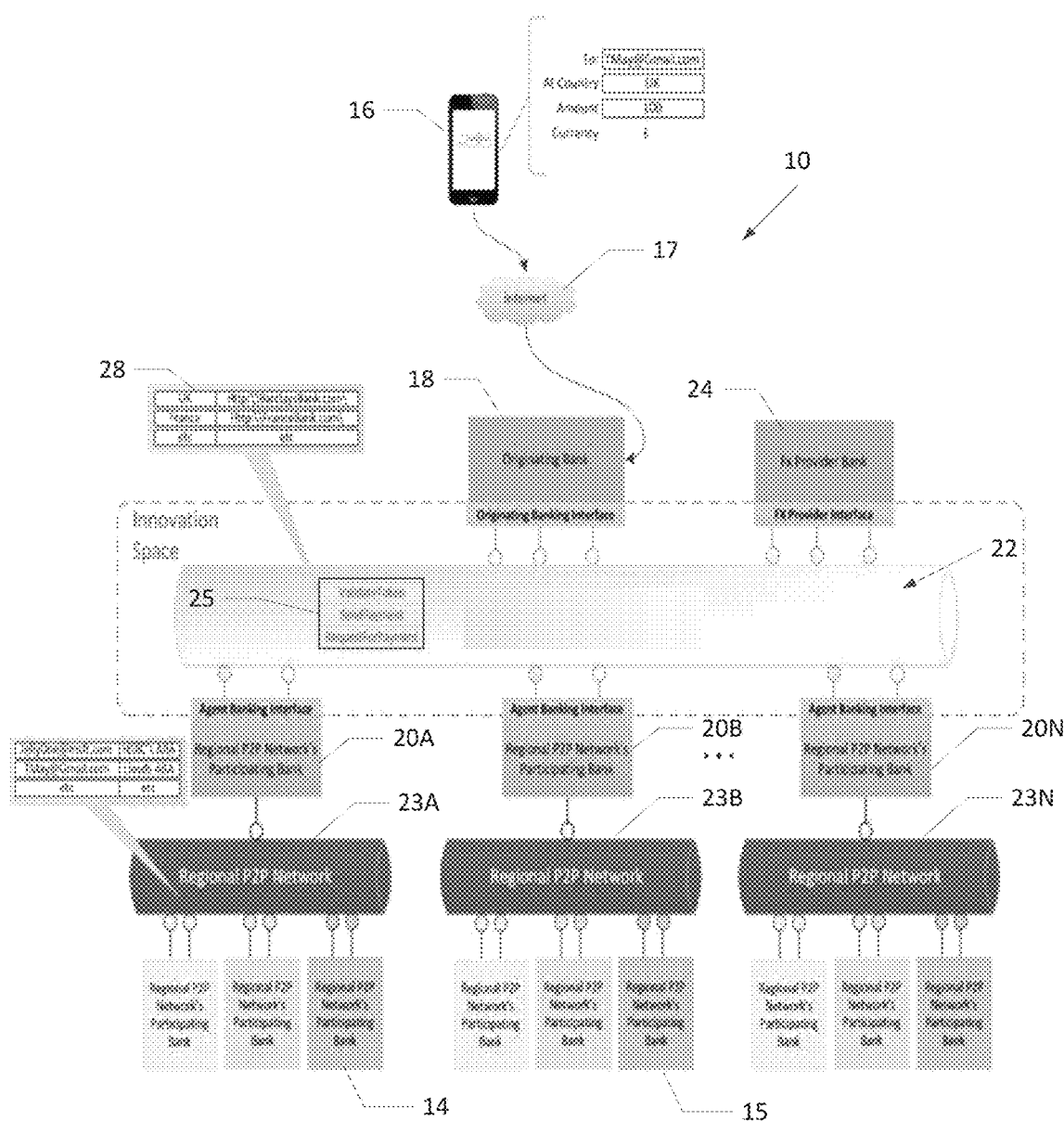
FIG. 1 is a diagram of a system for transferring, in real time, money from a bank account of a payer in a first country to a bank account of a beneficiary in a second, different, country according to various embodiments of the present invention.
Figure 2:
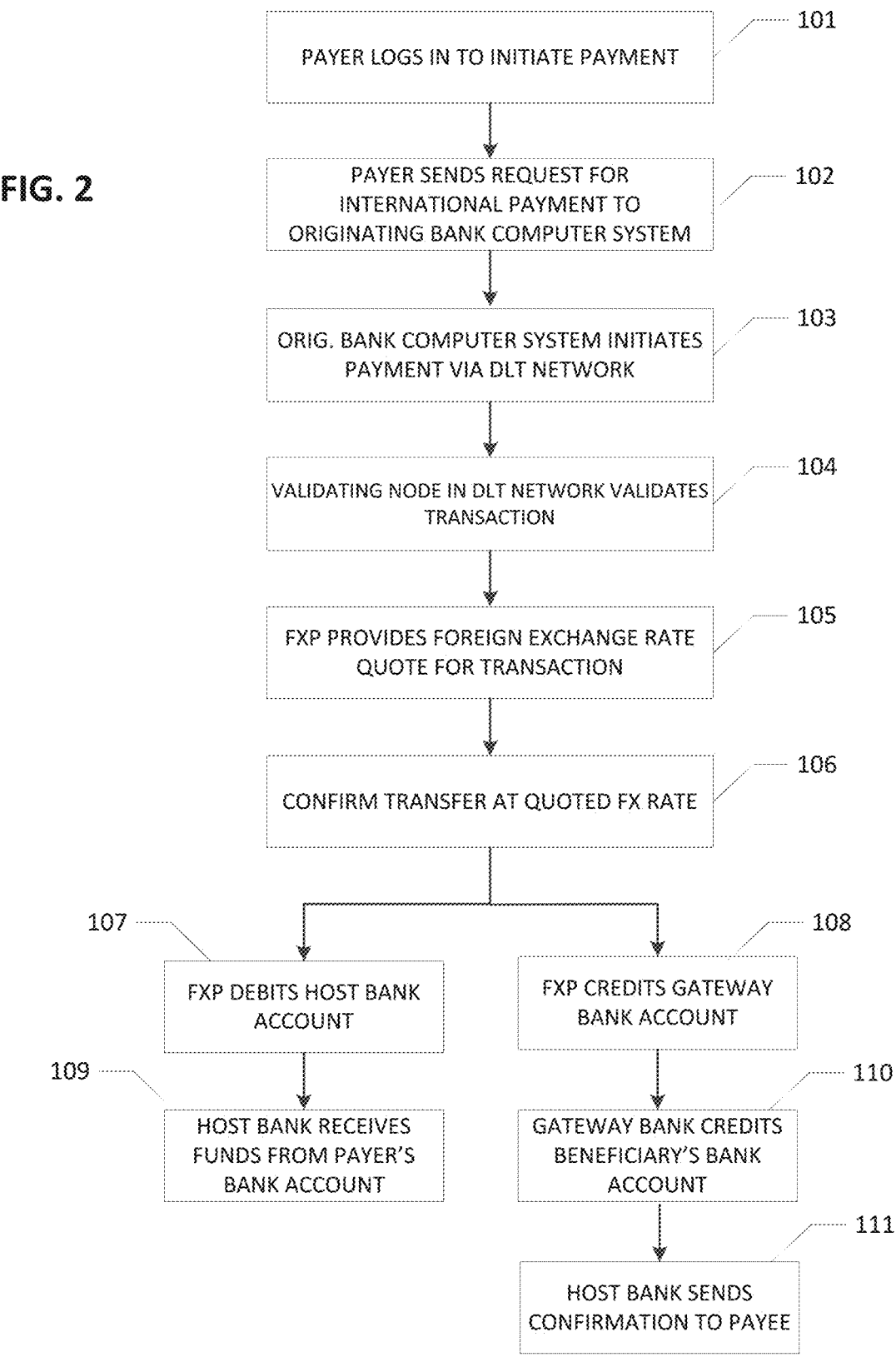
FIG. 2 is a flow chart depicting a method performed by the system of FIG. 1 according to various embodiments of the present invention.

FIG. 1 is a block diagram of a computer network or system 10 for transmitting, in real time, money electronically from the bank account of a payer, at an originating bank 18, to the bank account of another person or entity, the "beneficiary," at a bank 14. Correspondingly, FIG. 2 is a flow chart of a process that can be performed by the system 10 of FIG. 1 to make the real time, electronic bank transfer. In various embodiments, but not necessarily, the payer (and his/her bank account at originating bank 18) is located in a first country and the beneficiary (and his/her bank account at bank 14) is located in a second, different country. This international or cross-border embodiment is described first.

At step 101 (see FIG. 2), to initiate the money transfer, the payer may log into, at a computer device 16 of the payer, a mobile app or website of a digital payment system. Preferably, the app or website is provided by the originating bank 18 that provides the international digital payment system according to the present invention. By logging into or otherwise accessing the app or website, the payer's computer device 16 connects via a computer network (e.g., the Internet) 17 to a computer system of the originating bank ("originating bank computer system" 18). The originating bank computer system 18 may be implemented with one, or more preferably a number of network servers, such as part of a data center. The computer device 16 may communicate with the originating bank computer system 18 via a mobile network (e.g., a cellular network operated by a wireless carrier), the Internet, a WiFi network, etc.

Preferably, the beneficiary's bank account, at the bank 14, is registered with a Regional Person-to-Person P2P Payment Network 23A in the second (beneficiary's) country. As indicated in FIG. 1 and as will apparent from the description herein, the international P2P payment system of the present invention could be extended to multiple countries with their respective, Regional P2P networks 23B-N. A digital payment system or Regional P2P Network is a digital payment network that enables a payer to electronically transfer money from the payer's bank account to another user's bank account. Zelle is an example of a US Regional P2P Network; Paym is a Regional P2P Network for the United Kingdom; Interac is the Canadian P2P Network; and other digital payment systems exist in other countries. Currently, such Regional P2P Networks do not permit cross-border transfers, such that currently with such Regional P2P Networks, the bank accounts of the payer and beneficiary have to in the same country.

Figure 3:
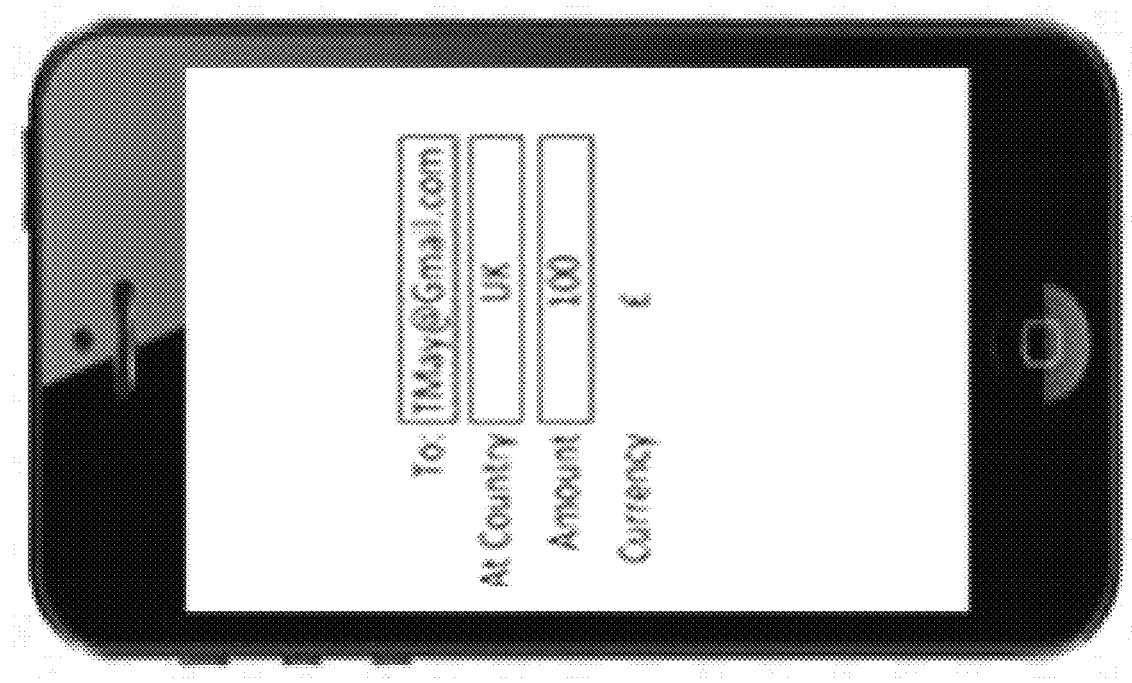
FIG. 3 depicts a user interface on a computing device of a payer for initiating the transfer according to various embodiments of the present invention.

In various embodiments, after logging in to the applicable app or website, the payer specifies the amount of the payment in the currency of the beneficiary's bank account (e.g., Y units of currency of the beneficiary's (the "second") country), a token identifier for the beneficiary, and the country of the beneficiary's bank account, as shown in the examples of FIGS. 1 and 3. The token identifier for the beneficiary is the identifier that the beneficiary has registered with the Regional P2P Network 23A in the beneficiary's country. Typically, the beneficiary's token identifier is the beneficiary's mobile phone number or email address. Preferably, no other personal identifying information is used by the payer or originating bank 18 to identify the beneficiary. As such, the payer does not need to specify the beneficiary's mailing address, beneficiary's bank account number, the beneficiary's bank, the address of the beneficiary's bank, etc. When the payer inputs the beneficiary's country, the originating bank computer system 18 may update the user interface for the payer on the payer's computer device 16 to show the currency for the beneficiary's country. In FIGS. 1 and 3 for example, the payer input "UK" for the beneficiary's country, so the user interface is updated to indicate British pounds, £. In other embodiments, the payer could input the amount to be transferred in the payer's currency (as opposed to the beneficiary's currency), and the system would determine the corresponding amount in the beneficiary's currency, as described below. For example, if the payer is located in the U.S. and the beneficiary is located in the UK, in such other embodiments, the payer could specify that $X USD is to be transferred from the payer's U.S. bank account (at originating bank 18), and the system would determine the corresponding number of British pounds to be credited to the beneficiary's bank account (at bank 14), as described below. In yet other embodiments, the system could deduce the regional P2P network 23A-N from the token, and prefill the country and currency by invoking, a Find Token ( ) API. If the beneficiary's phone number is used as the token, and if it includes a country code (e.g., 44 for UK, 81 for Japan, etc.), then the beneficiary country can be determined from the token and prefilled in the message.

The payer's computer device 16 is shown in FIGS. 1 and 3 as a mobile device, e.g., a smartphone. It could be any computer device that is capable of opening the app or website for making the transfer. For example, the payer's computer device 16 could be a mobile computing device, such as a smartphone, a table computer, a wearable computer, that stores and executes an app that opens a connection to the originating bank computer system 18 and allows the payer to specify the details of the transaction, such as shown in FIG. 3. In other embodiments, the payer's computer device 16 could be a laptop computer or a desktop computer with a browser, from which the payer can open a website hosted by the originating bank computer system 18 to specify the details of the transaction.

As shown in FIG. 1 and at step 102 of FIG. 2, the originating bank computer system 18 receives the payer's electronic communication initiating the money transfer. The originating bank computer system 18 may then, at step 103 of FIG. 2, electronically transmit or broadcast a message to execute the transaction to a payment computer network 22. In various embodiments, the computer network 22 is a decentralized, peer-to-peer network that employs distributed ledger technology, such as blockchain (a "DLT network").

A blockchain is a distributed ledger used to record financial transactions. In some cases, a blockchain includes of a series of data structures known as blocks each including a set of financial transactions. Each block includes a header with a hash derived from the contents of all the transactions in the block. A new block is inserted at the end of the blockchain by including a hash of the header of the last block in the chain in a previous block field in the header of the new block. This arrangement ensures that a change to the contents of a particular block in the chain will render the hashes in the previous block field incorrect for every subsequent block in the blockchain, thereby ensuring the consistency of the structure.

The blockchain is generally published to computing nodes of entities participating in the distributed transaction network, e.g., the network 22. In various embodiments, the blockchain could be public or, more preferably, a permission-based private network; in a private blockchain, the blockchain is published only to entities participating in a private distributed transaction network. In either case, the participating entities, e.g., computing nodes of the originating and agent banks or other computing nodes in the network 22, can verify new transactions simply by examining the contents of the blockchain, which includes the full financial record for all accounts in the network.

As such, the originating bank computer system 18 may broadcast the transaction by issuing a message for the transaction to all of the computing nodes in the DLT network 22. The message for the international bank account-to-bank account money transfer transaction according to embodiments of the present invention may include the token identifier for the beneficiary, the transaction amount in the payer's home currency, the beneficiary's country, and a cryptographic key for the originating bank 18 as a signature for the transaction.

One or more validator computing nodes 25 in the DLT network can validate the transaction at step 104 using, for example, specific validation rules that are set up for the DLT network 22 to validate such international person-to-person, real-time bank account transfers. Among other things, a validator computing node 25 can validate the originating bank based on the originating bank's cryptographic key in the block chain message issued by the originating bank computer system 18. Also, the validator node 25 can validate, based on the beneficiary's token included in the transaction's message, that the beneficiary has a bank account that is registered in the Regional P2P Network 23A of the beneficiary. As indicated in FIG. 1, the validating node 25 may validate the beneficiary's bank account by looking up, in a lookup table 28, the agent bank 20A-20N for the beneficiary's country. That is, the lookup table 28 may store a network address for each of the agent banks 20A-N, and the validator node 25 retrieves the address corresponding to the beneficiary's country (which is identified in the originating bank's message to the network 22). The look-up table 28 could be stored in a database at the validator node 25 and/or at some other computing node in the network 22. The validator node 25 can then send a message to the appropriate agent bank (in this example, agent bank 20A) at the network address specified in the look up table 28 to query whether the beneficiary has a bank account (at bank 14 in this example) that is registered in the Regional P2P Network 23A for the beneficiary's country. The validated transaction may then be stored in a block on the blockchain of the network 22 and encrypted with a hash by a computing node (e.g., the validator node 25) on the DLT network 22. At this point the validator node 25 may transmit an acknowledgment message to the originating bank computer system 18 via the computer network 22 indicating that the transaction is validated.

Assuming the transaction is validated, the network 22 can initiate the payment. At step 105, the network 22 may transmit a message electronically to a foreign exchange provider (FXP) 24 for a quote on an exchange from the currency of the payer's bank account (the "first country currency") to the currency of the beneficiary's bank account (the "second country currency"). Preferably, the FXP 24 has a nostro account of the originating bank 18 in the currency of the originating bank 18. A nostro account is an account that a bank, in this case the originating bank, holds in a foreign currency, in this case currency of the beneficiary's bank account, in another bank, in this case the FXP. Also, the agent bank 20 preferably has a nostro account at the FXP 24 in the currency of the beneficiary's bank account. The FXP 24 preferably provides to the originating bank computer system 18, electronically through a computer network (e.g., the DLT network 22), an electronic message with a quote at the then-applicable exchange rate; i.e., X units of the first country currency converts to Y units of second country currency. In various embodiments, one of the agent banks 20 could be the FXP 24. In case Nostro accounts are not setup at the FXP 24, an alternative settlement mechanism could be to wire the netted obligations between FXP and originating and agents banks. In this case, delayed settlement is introduced but the IOU's would be immutable.

At step 106, the transfer at the quoted exchange rate is confirmed. This step may involve, first, the originating bank computer system 18 confirming the transfer at the quoted exchange rate. In some variations of the invention, there may be multiple foreign exchange providers 24 on the network 22 from which the originating bank computer system 18 seeks and is provided foreign exchange quotes for the transfer. In such cases, the originating bank computer system 18 may execute systematic logic that selects the best foreign exchange rate based on parameters such as the best rate offered by the various foreign exchange providers 24 and their ratings. Step 106 can also involve, in various implementations, once the originating bank computer system 18 confirms the foreign exchange quote, the originating bank computer system 18 then providing a message with the exchange rate to the payer via the app or website that the payer used to initiate the transfer. Assuming the payer confirms the transfer at the quoted exchange rate, the originating bank computer system 18 can update the ledger for the transaction (e.g., add a block) with the agreed-to exchange rate and the payer's and originating bank's confirmation. At this point, the transaction across the three ledgers (originating bank, agent bank, and FXP) becomes immutable and cannot be altered. That way, per DLT, the agreed-to exchange rate and the confirmations are immutably and irrevocably recorded in the ledger.

The FXP 24 preferably acts as the liquidity provider for the transaction. That way, the originating and agent banks' accounts can be settled in real time, as opposed to being settled at the end of the day, which would expose the parties to a settlement risk. To execute the transfer, at step 107, the FXP 24, in real time, debits the originating bank's nostro account at the FXP X units of the first country currency (i.e., the currency of the payer's country) and, at step 108, credits the agent bank's nostro account at the FXP 24 Y units of the second country currency (i.e., the currency of the beneficiary's country). The originating bank 18 then, at step 109, debits X units of the first country currency from the payer's bank account at the originating bank 18 in real time. Similarly, at step 110, the agent bank 20A transfers Y units of second country currency to the beneficiary's bank account at the beneficiary's bank 14 in real time via the Regional P2P Network 23A in the beneficiary's country. Finally, at step 111, the originating bank computer system 18 can send confirmation to the payer, via the smartphone mobile app, email, text, etc., that the payment was successful.

In the end, in real time, the payer's bank account is debited X units of the payer's currency and the beneficiary's bank account is credited Y units of the beneficiary's currency, and details about the transaction are recorded on the DLT network's distributed ledger, including the beneficiary's token (but not other personal identifying information of the beneficiary), the confirmed FX quote, the acceptance of the transaction by the originating bank, and confirmations of the payments.

In this context, "real time" refers to the time it takes for a computer system to processing incoming data and/or messages. Usually this is on the order seconds or fractions of a second. Thus, the money transfers described herein are completed in a matter of a few minutes, i.e., the money is deposited in the beneficiary's account within a few minutes after the payer's initiates the transfer, as opposed to hours or days after the payer initiates the transfer. The biggest delay are the communications between the (i) the originating bank computer system 18 and the payer via the digital payment system in the payer's country, particularly to get the payer's acceptance of the foreign exchange rate (see step 106), and (ii) the agent bank computer system 20 and the beneficiary's bank 24 via the digital payment system in the beneficiary's country. Thus, once the transaction is sent to the blockchain network 22, it is settled in real time and reflected in the originating bank's liquidity position in the blockchain scheme, with no need for an intermediary central authority to manage and with full transparency between all the peers in the network 22. Also, the transactions could be made at any time of day, any day of the week ("24/7"), as there is no requirement for any of the banks in the network to be open during normal business hours to execute the transfer.

In the above description, banks are the originator 18 and agents 20. In other embodiments, organizations or entities other than banks could operate as the originators (i.e., an originating entity 18) or as the agent (i.e., an agent entity 20).

In some embodiments, the FX provider 24 could be agent bank 20. In such circumstances, the FX provider/agent bank may provide a lesser FX spread. Also, regardless of whether the FX provider is an agent bank, the FX provider may provider wider spreads if the country of the originating bank 18 is higher risk. Also, in the above-described embodiment, the FXP 24 acted as the settlement agent. In other embodiments, the originating bank could wire the funds to the agent bank using conventional wire transfer means, such as via the SWIFT networks, although such a wire transfer may not clear in real time. Also, end-of-day the parties could deduce net obligations and being responsible for messaging clearing files to the responsible entities, with the net obligations being transferred by traditional wire means, again which would likely not be in real time.

In the embodiments described above, the payer specified the country of the beneficiary. In other embodiments, the payer need not identify the beneficiary of the country. In such embodiments, one or more nodes of the DLT network 22 may store a database table that identifies the applicable country for the beneficiary's token. That way, when the payer specifies the beneficiary's token, a computing node of the DLT network 22 can look up the country for the beneficiary based on the beneficiary's token and determine the applicable currency for that country. In other embodiments, the validating node 25 may send a FindToken ( ) API message to each agent bank 20A-N, where the agent banks can respond to the validating node that the beneficiary is either registered or not with the Regional P2P network 23A-N associated with the responding agent bank.

In some cases, a beneficiary may be associated with multiple countries. For example, with reference to FIG. 1, the beneficiary may have a first bank account with the bank 14 that is registered with a first Regional P2P Network 23A and a second bank account with a bank 15 in a second Regional P2P Network 23B; and so on. In such circumstances, according to various embodiments, the payer may select the beneficiary bank account to which the funds are transferred. In an embodiment where the payer makes such a selection, the validating node 25 will identify the two (or more) bank accounts and report this condition to the originating bank computer system 18. The originating bank computer system 18 can then send a query message to the payer, via the mobile app or website, requesting that the payer pick the country for the beneficiary. For example, if the beneficiary has registered bank accounts in the UK and Canada associated with his/her token, the originating bank computer system 18 can report back to the payer, via the mobile app or website, that the beneficiary has accounts in the UK and Canada, and request that the payer select one of them for the transfer. When the payer makes the selection, via the mobile app or website, the process of FIG. 2 can proceed as described above.

Also, in the above description, it was assumed that the beneficiary was in a different country than the payer. That does not need to be the case. If the beneficiary is in the same country at the payer, that is if the Regional P2P Network 23A and the bank 14 for the beneficiary are in the same country as the payer. The process can proceed as described above, except that the steps involving the FXP 24 can be eliminated since no currency conversion is required. That is, for example, as described above, the validator node 25 of the DLT network 22 can identify the agent bank 20A for the beneficiary (in this example, the agent bank 20 would be in the same country as the originating bank 18) and send the payment to the beneficiary's bank 14 via the agent bank 20A.

In various embodiments, when nodes enroll into the DLT network 22, their onboarding software, which is downloaded to the nodes, provides the IP addresses to register with the ecosystem of the network 22. Subsequent participants that download the blockchain-node software can then connect to the initial nodes. From there, the IP addresses of the other nodes can be discovered by asking one of the initial nodes about the addresses of other nodes that joined the network. Indeed, the nodes of the network 22 can inform new nodes that join the network of the IP addresses of the existing nodes. Messages may be written to disk at the computing and, in the case of a connectivity interruption, delivery may be retried until the remote node has acknowledged a message, at which point it is expected to have either reliably stored the message or processed it completely. In various embodiments, all messages may be encoded using a compact binary format. The network messages may also have an associated multi-bit (e.g., 64-bit) session ID, which can be used to group messages. Messages that are successfully processed by a node may generate a signed acknowledgement message called a "receipt." The purpose of the receipts is to give a node undeniable evidence that a counterparty received a notification that would stand up later in a dispute mediation process.

FIG. 1 indicates that each of the originating bank computer system 18, the agent bank computing system 20A-N and the FXP computer systems 24 should have appropriate computer interfaces for connecting to the DLT network 22 so that the nodes can receive and send messages via the network 22.

In another embodiment, instead of using a blockchain, each of the originating bank 18, agent bank 20 and FXP 24 could send messages via a computer network according to distributed application programming interfaces (APIs) that define the message definitions and protocols for implementing the real-time transfers. Such an embodiment is similar to the blockchain embodiment described previously, except that instead of broadcasting the transaction to the blockchain and having details about the transaction recorded on the blockchain's distributed ledger, the originating bank computer system 18, the agent bank computer system 20, and the FXP 24 can exchange messages via a electronic data network (such as a LAN, a WAN, the Internet, etc.) using the APIs to implement the transaction. For example, similar to the blockchain example, the originating bank computer system 18 may send a message, according to the applicable API, to a computing node in the network 22, where the message include the beneficiary's token and the amount to be transferred (e.g., either in the payer's currency or the beneficiary's currency, as described above). The computing node may then validate the transaction, including validating that the beneficiary has a bank account registered with the Regional P2P network 23A. This may require that the agent bank 20A for the beneficiary's Regional P2P network 23A have the appropriate API for receiving and responding to the token registration requests from the computing node. For example, the agent bank computer system 20 may verify that the beneficiary has a registered bank account and send an acknowledgement message, according to the API, back to the computing node. The agent bank computer system 20 may verify that the beneficiary has a registered bank account through a look-up table in database based on the beneficiary's token.

After receiving the acknowledgement message from the agent bank computer system 20, the computing node may then send a message, according to the applicable API, to the FXP 24 for the foreign exchange rate quote and the process may proceed as shown in steps 105-110 of FIG. 2. Again, the FXP 24 would need to the applicable API to receive and respond to the messages from the computing node.

A non-exhaustive list of APIs that the validator node 25 and/or a node of the non-DLT network in such an embodiment may use to perform the transaction steps described herein includes:

FindToken, whose input is the specified token value and whose output (response) is the corresponding agent bank 20 of the beneficiary MakePayment ( ), whose inputs are a Payment Confirmation ID, the payment amount, the currency, and the beneficiary token, and whose output is the status of the payment or an error code if an error occurred ChangePaymentStatus ( ), whose inputs are the Payment Confirmation ID and the payment status GetStatus ( ), whose input is the Payment Confirmation ID and whose output is the status and bank ID for the bank that provided the status Get FxRate ( ), whose inputs are the Amount, the payer's currency, and the beneficiary's currency)

LockFxRate ( ), whose input is Payment Confirmation ID

CommitFxRate ( ), whose input is Payment Confirmation ID

TracePayment( ), whose input is the Payment Confirmation ID and whose output is the status of the payment or PaymentStop if the payment has been stopped TraceAndRollbackPaymentt( ), whose inputs are the Payment Confirmation ID and the reason for the rollback.

The electronic messages described herein, such as and including electronic messages (i) between the payer 16 and the originating bank computer system 18, (ii) between the originating bank computer system 18 and the agent bank computer system 20, including messages sent via the DLT network 22, (iii) to and from the foreign exchange provider 24, and (iv) between the agent bank computer system 20 and the beneficiary's bank 14, may be any suitable type of electronic message that can be sent over a computer network, and can include packets, frames, datagrams, etc. In that connection, the various computer components described herein can communicate using any suitable network protocol, such as the Transmission Control Protocol (TCP), Internet Protocol (IP), Hypertext Transfer Protocol (HTTP), File Transfer Protocol (FTTP), or any other suitable network protocol. For example, the originating bank computer system 18 can communicate with the DLT network 22 using any of these network protocols, including when it broadcasts the message to the DLT network 22 to initiate the transaction.

The originating bank, agent bank and foreign exchange provider computer systems can be implemented with one or a network of servers. Each such server may comprise one or more processor cores and computer memory for storing software executed by the processor core(s). The program instructions (e.g., software) could be stored in computer memory that is accessible by the processor cores, such as RAM, ROM, processor registers or processor cache, for example. Data may be shared between the various systems using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to a method of operating computing nodes of a computer network. The method comprises the step of receiving, by a computer system of originating entity ("the originating entity computer system"), that includes at least one computing node, an electronic message from a computer device of a payer to transfer money from a bank account of the payer in a first country to a bank account of a beneficiary in a second, different, country. The electronic message comprises a request for a transaction by the payer to transfer Y units of second country currency to the bank account of the beneficiary in the second country from the bank account of the payer in the first country, and for purposes of identifying the beneficiary's bank account, the electronic message from the payer comprises a token identifying the beneficiary, without including any other personal identifying information of the beneficiary. The method further comprises sending, by the originating entity computer system, to a distributed ledger technology (DLT) network, a message to initiate the transaction, where the message is endorsed with a cryptographic key of the originating entity computer system. The method further comprises validating, by a validator computing node of the DLT network, the transaction. Validating the transaction comprises: verifying, by the validating node, that the cryptographic key of the originating entity computer system is valid; and verifying, by the validating node, based on the token, that the beneficiary has a bank account registered with a digital payment system for the second country. Verifying that the beneficiary has a bank account registered with the digital payment system for the second country comprises: determining, by the validating node, an agent entity in the second country for the transaction; and sending, by the validating node, via the DLT network, an electronic query message to the agent entity in the second country querying whether the beneficiary has a bank registered bank account with the digital payment system in the second country. The method further comprises, in response to receiving a verification that the beneficiary has a bank registered bank account with the digital payment system in the second country, obtaining, by the validating node, from a foreign exchange provider computer system of a foreign exchange provider, via the DLT network, a foreign exchange currency quote that X units of first country currency converts to Y units of second country currency, wherein the foreign exchange provider has nostro accounts for the originating bank and the agent bank. Upon acceptance of the foreign exchange currency quote: the agent entity computer system sends, via the digital payment system in the second country, using the token for identifying the beneficiary, a payment of Y units of second country currency to the bank account of the beneficiary; the foreign exchange provider computer system debits the nostro account of the originating entity X units of first country currency and crediting an account of the agent entity Y units of second country currency; and the originating entity computer system debits the bank account of the customer X units of first country currency. Further, the process is completed in real-time and the distributed ledger of the DLT network records data about the transaction, the data comprising the token, acceptance by the originating entity and the agent entity of the transaction, and the foreign exchange currency quote.

A network of computing nodes according to various embodiments of the present invention comprises a computer system of originating entity ("the originating entity computer system") that includes at least one computing node; a computer system of an agent entity ("the agent entity computer system") that includes at least one computing node; and a distributed ledger technology (DLT) network that comprises a plurality of computing nodes. The originating entity computer system is configured to receive an electronic message from a computer device of a payer to transfer money from a bank account of the payer in a first country to a bank account of a beneficiary in a second, different, country, where the electronic message comprises a request for a transaction by the payer to transfer Y units of second country currency from the bank account of the payer in the first country to the bank account of the beneficiary in the second country, and for purposes of identifying the beneficiary's bank account, the electronic message from the payer comprises only a token identifying the beneficiary and without including any other personal identifying information of the beneficiary. The originating entity computer system is also configured to send to the distributed ledger technology (DLT) network, a message to initiate the transaction, where the message is endorsed with a cryptographic key of the originating entity computer system. The computing nodes of the DLT network are configured to verify that the cryptographic key of the originating entity computer system is valid; verify, based on the token, that the beneficiary has a bank account registered with the digital payment system for the second country; and in response to receiving a verification that the beneficiary has a registered bank account with the digital payment system in the second country, obtain, from a foreign exchange provider computer system of a foreign exchange provider, a foreign exchange currency quote that X units of first country currency converts to Y units of second country currency, where the foreign exchange provider has nostros accounts for the originating and agent banks. The computing nodes of the DLT network verify that the beneficiary has a registered bank account with the digital payment system for the second country by: determining an agent entity in the second country for the transaction; and sending an electronic query message to the agent entity in the second country querying whether the beneficiary has a registered bank account with the digital payment system in the second country. Upon acceptance of the foreign exchange currency quote: (i) the agent entity computer system is configured to send, via the digital payment system in the second country, using the token for identifying the beneficiary, a payment of Y units of second country currency to the bank account of the beneficiary; and (ii) the foreign exchange provider computer system is configured to debit the nostro account of the originating entity X units of first country currency and credit an account of the agent entity Y units of second country currency. The transfer is completed in real-time and the distributed ledger of the DLT network records data about the transaction, the data comprising the token, acceptance by the originating entity and the agent entity of the transaction, and the foreign exchange currency quote.

In various implementations, the originating entity is an originating bank and the agent entity is an agent bank. Also, the computer device of the payer is a mobile computing device and the electronic message to transfer the money from the bank account of the payer to the bank account of the beneficiary is made via an app running on the computer device of the payer. In addition, the method/system may further comprise accepting, by the originating entity computer system and/or the payer, the foreign exchange currency quote. Also, the electronic message from the computer device of the payer to transfer the money may identify the country of the beneficiary. In that case, the validating node of the DLT network can use a look-up table to determine the appropriate agent bank for the specified country. A message according to the "FindToken" API can then be used to determine if the token exists in the regional P2P network serviced by the agent bank. If no country is specified in the message, messages to each agent bank using the "FindToken" API may then be used to see if any agent bank responds that the token is registered in its regional P2P network.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method, comprising:
   receiving, by an originating entity computer system that includes at least one computing node, an electronic message from a computer device of a payer to transfer money from a bank account of the payer in a first country to a bank account of a beneficiary in a second country, wherein the second country is different than the first country, wherein the electronic message is received via a first country digital payment system and comprises a request for a transaction by the payer to transfer Y units of second country currency to the bank account of the beneficiary in the second country from the bank account of the payer in the first country, wherein the electronic message from the payer comprises a token that is a registered identifier of the beneficiary with a second country digital payment system, and wherein the received request does not include any other information identifying the bank account of the beneficiary;
   sending, by the originating entity computer system and to a distributed ledger technology (DLT) network, a message initiating the transaction, wherein the message is endorsed with a cryptographic key of the originating entity computer system;
   validating, by a validator computing node of the DLT network, the transaction, wherein validating the transaction comprises:
      verifying, by the validator computing node, that the cryptographic key of the originating entity computer system is valid; and
      verifying, by the validator computing node and based on the token, that the beneficiary has a bank account registered with the second country digital payment system, wherein verifying that the beneficiary has a bank account registered with the second country digital payment system comprises:
         determining, by the validator computing node, an agent entity in the second country for the transaction; and
         sending, by the validator computing node and via the DLT network, an electronic query message to the agent entity in the second country querying whether the beneficiary has a registered bank account with the second country digital payment system;
   in response to receiving a verification that the beneficiary has the registered bank account with the second country digital payment system, obtaining, by the validator computing node, from a foreign exchange provider computer system of a foreign exchange provider and via the DLT network, a foreign exchange currency quote that X units of first country currency converts to Y units of the second country currency, wherein the foreign exchanger provider has a first nostro account for an originating entity and a second nostro account for the agent entity;
   upon acceptance of the foreign exchange currency quote:
      transferring, by the agent entity computer system via the second country digital payment system and using the token for identifying the beneficiary, a payment of the Y units of the second country currency to the bank account of the beneficiary;
      debiting, by the foreign exchange provider computer system, the first nostro account of the originating entity the X units of the first country currency and crediting the second nostro account of the agent entity the Y units of the second country currency;
      debiting, by the originating entity computer system, the bank account of the payer the X units of the first country currency, wherein the transaction is completed in real-time, and wherein a distributed ledger of the DLT network records data about the transaction, the data comprising the token, acceptance by the originating entity and the agent entity of the transaction, and the foreign exchange currency quote; and crediting, by the second country digital payment system, the bank account of the beneficiary the Y units of the second country currency by transferring the Y units of the second country currency from the second nostro account of the agent entity to the bank account of the beneficiary.

2. The method of claim 1, wherein the originating entity is an originating bank, and wherein the agent entity is an agent bank.

3. The method of claim 1, wherein the computer device of the payer is a mobile computing device, and wherein the electronic message transferring the money from the bank account of the payer to the bank account of the beneficiary is made via an app running on the computer device of the payer.

4. The method of claim 1, further comprising:
accepting, by the originating entity computer system, the foreign exchange currency quote.

5. The method of claim 1, further comprising:
accepting, by both the originating entity computer system and the payer, the foreign exchange currency quote.

6. The method of claim 1, wherein the electronic message from the computer device of the payer transferring the money identifies a country of the beneficiary.

7. The method of claim 1, wherein the electronic message from the computer device of the payer transferring the money does not identify a country of the beneficiary, and wherein determining the agent entity for the transaction comprises performing, by the validator computing node, a database look-up based on the beneficiary's token identifying the agent entity.

8. The method of claim 1, wherein the electronic message from the computer device of the payer transferring the money does not identify a country of the beneficiary, and wherein determining the agent entity for the transaction comprises transmitting, by the validator computing node, a FindToken API message to a plurality of agent entities.

9. A system, comprising:
an agent entity computer system including at least one computing node;
an originating entity computer system including at least one computing node, wherein the originating entity computer system is configured to:
  receive an electronic message from a computer device of a payer to transfer money from a bank account of the payer in a first country to a bank account of a beneficiary in a second country, wherein the second country is different than the first country, wherein the electronic message is received via a first country digital payment system and comprises a request for a transaction by the payer to transfer Y units of second country currency from the bank account of the payer in the first country to the bank account of the beneficiary in the second country, wherein the electronic message from the payer comprises a token that is a registered identifier of the beneficiary with a second country digital payment system, and wherein the received request does not include any other information identifying the bank account of the beneficiary; and
  send to a distributed ledger technology (DLT) network a message initiating the transaction, wherein the message is endorsed with a cryptographic key of the originating entity computer system; and
the DLT network comprising a plurality of computing nodes, wherein the plurality of computing nodes of the DLT network are configured to:
  verify that the cryptographic key of the originating entity computer system is valid;
  verify, based on the token, that the beneficiary has a bank account registered with the second country digital payment system by:
    determining an agent entity in the second country for the transaction; and
    sending an electronic query message to the agent entity in the second country querying whether the beneficiary has a registered bank account with the second country digital payment system;
  in response to receiving a verification that the beneficiary has the registered bank account with the second country digital payment system, obtaining, from a foreign exchange provider computer system of a foreign exchange provider, a foreign exchange currency quote that X units of first country currency converts to Y units of the second country currency, wherein the foreign exchange provider has a first nostro account for an originating entity and a second nostro account for the agent entity:
  upon acceptance of the foreign exchange currency quote:
    transfer, by the agent entity computer system via the second county digital payment system and using the token for identifying the beneficiary, a payment of the Y units of the second country currency to the bank account of the beneficiary;
    debit, by the foreign exchange provider computer system, the first nostro account of the originating entity the X units of the first country currency, and credit the second nostro account of the agent entity the Y units of the second country currency, wherein the transfer is completed in real-time, and wherein a distributed ledger of the DLT network records data about the transaction, the data comprising the token, acceptance by the originating entity and the agent entity of the transaction, and the foreign exchange currency quote; and
    credit, by the second country digital payment system, the bank account of the beneficiary the Y units of the second country currency by transferring the Y units of the second country currency from the second nostro account of the agent entity to the bank account of the beneficiary.

10. The system of claim 9, wherein the computer device of the payer is a mobile computing device, and wherein the electronic message transferring the money from the bank account of the payer to the bank account of the beneficiary is made via an app running on the computer device of the payer.

11. The system of claim 9, wherein the electronic message from the computer device of the payer transferring the money identifies a country of the beneficiary.

12. The system of claim 9, wherein the electronic message from the computer device of the payer transferring the money does not identify a country of the beneficiary, and wherein a validator computing node is configured to perform a database look-up based on the beneficiary's token identifying the agent entity for the transaction.

13. The system of claim 9, wherein the electronic message from the computer device of the payer transferring the money does not identify a country of the beneficiary, and wherein a validator computing node is configured to transmit a FindToken API message to a plurality of agent entities.

14. A system, comprising:

an agent entity computer system including at least one computing node; and an originating entity computer system including at least one computing node, wherein the originating entity computer system is configured to:

receive an electronic message from a computer device of a payer to transfer money from a bank account of the payer in a payer country to a bank account of a beneficiary in a beneficiary country, wherein the electronic message is received via a beneficiary country digital payment system and comprises a request for a transaction by the payer to transfer Y units of beneficiary country currency from the bank account of the payer to the bank account of the beneficiary, and wherein the electronic message from the payer comprises a token that is a registered identifier of the beneficiary with a beneficiary country digital payment system without including any other information identifying the bank account of the beneficiary; and send to a distributed ledger technology (DLT) network, a message initiating the transaction, wherein the message is endorsed with a cryptographic key of the originating entity computer system; and the DLT network comprising a plurality of computing nodes, wherein the plurality of computing nodes of the DLT network are configured to:

verify that the cryptographic key of the originating entity computer system is valid;

verify, based on the token, that the beneficiary has a bank account registered with the beneficiary country digital payment system by:

determining an agent entity in the beneficiary country for the transaction; and sending an electronic query message to the agent entity in the beneficiary country querying whether the beneficiary has a registered bank account with the beneficiary country digital payment system;

in response to receiving a verification that the beneficiary has the registered bank account with the beneficiary country digital payment system, the agent entity computer system is configured to:

transfer, via the beneficiary country digital payment system and using the token for identifying the beneficiary, a payment of the Y units of the beneficiary country currency to the bank account of the beneficiary, wherein the transfer is completed in real-time, and wherein a distributed ledger of the DLT network records data about the transaction, the data comprising the token, and acceptance by the originating entity and the agent entity of the transaction.

15. The system of claim 14, wherein the computer device of the payer is a mobile computing device, and wherein the electronic message transferring the money from the bank account of the payer to the bank account of the beneficiary is made via an app running on the computer device of the payer.

16. The system of claim 14, wherein the electronic message from the computer device of the payer transferring the money identifies a country of the beneficiary.

17. The system of claim 14, wherein the electronic message from the computer device of the payer transferring the money does not identify a country of the beneficiary, and wherein a validator computing node is configured to perform a database look-up based on the beneficiary's token identifying the agent entity for the transaction.

18. The system of claim 14, wherein the electronic message from the computer device of the payer transferring the money does not identify a country of the beneficiary, and wherein a validator computing node is configured to transmit a FindToken API message to a plurality of agent entities.

* * * * *